United States Patent
Cleary

[11] 3,712,322
[45] Jan. 23, 1973

[54] APPARATUS FOR VARYING THE FLOW RATE OF GAS INTO A VACUUM SYSTEM

[75] Inventor: Thomas R. Cleary, Drexel Hill, Pa.

[73] Assignee: Burroughs Corporation, Detroit, Mich.

[22] Filed: July 6, 1970

[21] Appl. No.: 52,263

[52] U.S. Cl. .................137/81.5, 137/92, 137/340
[51] Int. Cl. ..............................................F15c 1/04
[58] Field of Search..............137/92, 13, 340, 81.5

[56] References Cited

UNITED STATES PATENTS

| | | | |
|---|---|---|---|
| 3,410,286 | 11/1968 | Satake | 137/13 |
| 3,496,837 | 2/1970 | McEuen | 137/13 X |
| 3,025,232 | 3/1962 | Jones, Jr. | 137/92 X |
| 2,010,661 | 8/1935 | French | 137/13 X |
| 3,228,414 | 1/1966 | Zemgian | 137/340 |
| 3,247,901 | 4/1966 | Brandon | 137/340 X |
| 3,344,799 | 10/1967 | Hardin | 137/92 |
| 3,414,522 | 12/1968 | Hoekstra | 137/92 X |
| 3,493,345 | 2/1970 | Windley | 137/92 X |
| 3,494,369 | 2/1970 | Inoue | 137/13 |
| 3,520,312 | 7/1970 | Ackerman et al. | 137/92 X |
| 3,537,514 | 11/1970 | Levedahl | 137/13 X |

*Primary Examiner*—Samuel Scott
*Attorney*—Paul W. Fish, Edward J. Feeney, Jr. and Charles S. Hall

[57] ABSTRACT

A capillary leak for supplying controlled amounts of gases to a vacuum system. The rate of flow of gas into the system is controlled by controlling the temperature of the capillary tube. The tube is heated by passing an electrical current through a portion of it and is cooled either by forced air or by a water jacket. The use of a water jacket enables use of the apparatus within the vacuum chamber thereby decreasing system response time.

9 Claims, 3 Drawing Figures

PATENTED JAN 23 1973

INVENTOR.
THOMAS R. CLEARY
BY Edward J. Feeney Jr.
ATTORNEY

APPARATUS FOR VARYING THE FLOW RATE OF GAS INTO A VACUUM SYSTEM

BACKGROUND OF THE INVENTION

1. Field of the Invention

This invention relates to the field of adjustable gas flow control of small amounts of gas into a vacuum system. There are numerous commercially available devices which provide this flow control by mechanically or thermally varying the cross-sectional dimensions of the leak. However, such devices are usually very sophisticated since they require complex mechanical configurations to accomplish the cross-sectional variations. Furthermore, at least in the case of the entirely mechanical devices, the degree of control is very coarse and precise regulation is extremely difficult.

2. Description of the Prior Art

In the past, many of these so-called leaks utilized mechanical valves which were manually operated to control the flow-rate of gas entering the vacuum. An example of such a device is illustrated in U.S. Pat. No. 2,664,111, entitled "Fluid Flow Control." issued to J. J. Piros. It shows a valve housing which includes a manual control handle in conjunction with a quantity of Mercury in a chamber. Within the Mercury is an element with a long compressible area such as, for example, a length of Neoprene tubing. By applying pressure over such a large compressible area, the pressure drop is taken across a relatively long-length and the cross-sectional area available for fluid flow is considerably larger than in conventional control methods and valves. However, while it is appreciated that this is an improvement over existing mechanically operated leaks wt still retains the disadvantages inherent with mechanical control.

There are a number of other similar devices in the prior art, but in those devices generally known, the systems use manually operative coarse controls which, for the most part, are incapable of being utilized within the vacuum system itself.

BRIEF SUMMARY OF THE INVENTION

The present device provides a faster, more easily controlled flow rate at rates in the neighborhood of 0.02 to 0.20 cubic feet/hour.

The principles of operation are very simple. A capillary tube is connected between a gas supply at or above atmospheric pressure and the vacuum system. The rate of gas flow (g moles/sec.) is determined by the pressure differential, the viscosity of the gas, and the diameter and length of the capillary. If the temperature of the tube is increased, the gas density increases and its density decreases while the diameter of the tube increases slightly. Both of these factors will reduce the mass transfer rate of the gas. However, the increase in the diameter of the tube has a negligible effect on flow rate.

While the device has exhibited the control of flow rate described above, the response time can be increased by direct heating of the capillary with electric current and either forced air or water cooling.

Another way to speed up the response of the control is to place the control inside the vacuum system at the very end of the gas supply tube thus eliminating the response time of the tubing between a leak external to the vacuum chamber and the point in the vacuum system to which the gas is to be delivered. Other types of leaks commercially available do not lend themselves as readily to placement inside the vacuum system nor do they provide precise control attainable by the present device.

Accordingly, it is an object of the present invention to provide apparatus which varies the flow rate of gas through a capillary tube in a precise, non-mechanical manner.

It is also an object of the present invention to provide apparatus which varies the flow rate of gas through a capillary by varying the temperature of the capillary tube.

It is a still further object of the present invention to provide a leak control device which adapts itself readily to placement inside the vacuum system.

These and other objects as well as other advantages of this invention will be readily appreciated as the invention becomes better understood by reference to the following detailed description when considered in connection with the accompanying drawings.

DETAILED DESCRIPTION OF THE INVENTION INCLUDING THE PREFERRED EMBODIMENT

Figure 1:
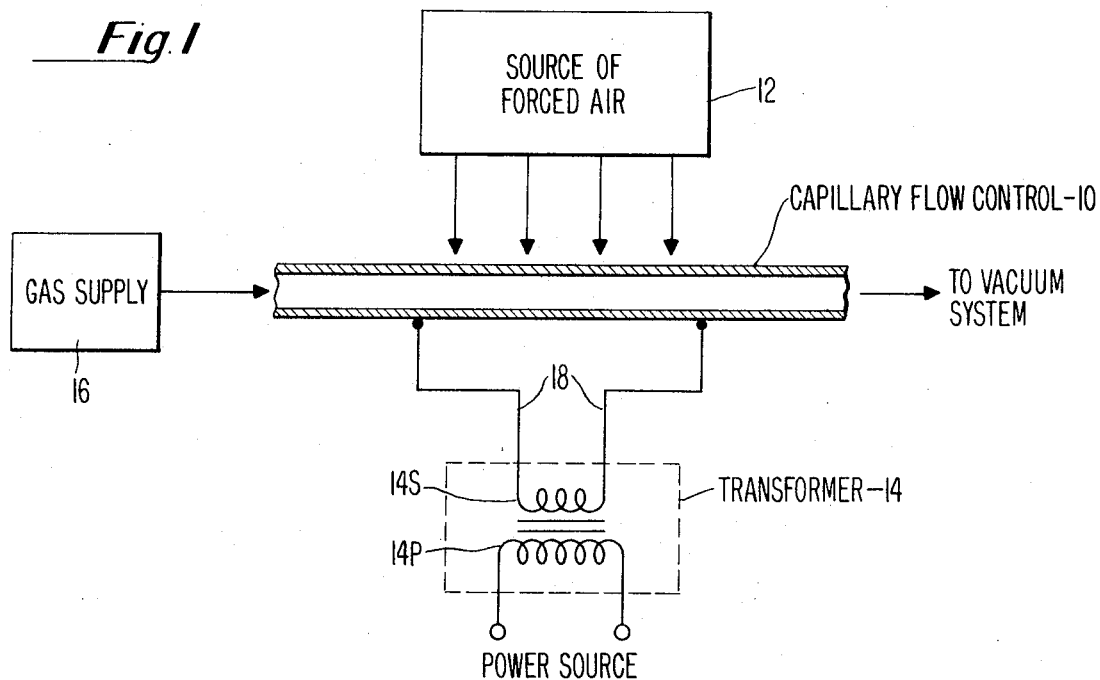
FIG. 1 is a partial schematic, partial pictorial drawing of the device utilizing a transformer secondary as the source of heating and forced air as a means of cooling the capillary tube.

FIG. 1 shows the device including a capillary tube 10 receiving gas from a gas supply 16. The opposite end of this capillary tube feeds the gas into the vacuum system. The capillary tube is required to be an electrical conductor and copper or a similar material is suggested.

A pair of heavy conductors 18 are connected between the secondary 14S of the transformer 14 and the capillary tube 10. These conductors must be sufficiently larger than the capillary tube to prevent any heating thereof.

The conductors should have a cross-section sufficiently larger than the capillary so that the current will heat the capillary and not the conductors, i.e., the electrical resistance of the conductor should be low compared to the capillary tube. When power is supplied to the primary 14P of the transformer 14, the portion of the capillary tube 10 completes the electrical path between the conductors 18 and the flow of current through the tube causes the tube to heat thereby increasing the temperature of the gas passing therethrough. It will be shown mathematically that this increase in the temperature of the gas will cause the flow rate of the gas to decrease. In fact, it will be seen that the major contributions to the change in flow rate are made by the decrease in the density of the gas and the increase in its viscosity while the expansion of the capillary tube has a negligible effect on mass flow.

In the example given below it is desired to control the flow of gas into a vacuum chamber for sputtering. The pressure in the sputtering chamber is on the order of 50 microns of Hg while the external gas supply is at one or two pounds per square inch (psi) above atmospheric pressure.

Most of the flow through the capillary tube 10 will be viscous flow i.e., the means free path is much much less than the diameter of the tube. Based on the viscous or Poiseville flow (see S. Dushman, "Scientific Foundations of Vacuum Techniques," John Wiley and Sons, Inc., Pages 80–86) the flow rate is:

$$Nm = \pi/16 N_T \cdot a^4/l \cdot (P_2^2 - P_1^2)/RoTm$$

where $l$ = length of tube in centimeters
$P_2$ = pressure at high pressure end of tube in $u$ bars
$P_1$ = pressure at low pressure end of tube in $u$ bars
$a$ = radius of tube in cm
$Ro$ = 62.364 mm-liter · degree $^{-1}$K (g mole $^{-1}$)
    = 62.364 × 1330×1000$u$ bar − cm$^3$ · degree $^{-1}$K · g mole $^{-1}$
$Nm$ = moles per second
$NT$ = viscosity of gas = $aT^x$ (see Dushman)
For Argon $a = 2.782 \times 10^{-6}$ $x = .766$
Viscosity is in units of
g cm$^{-1}$ sec $^{-1}$
dyne · sec · cm
$u$ bar sec
For $a$ = .005 inches = .0125 cm
$T$ = 302° K
$l$ = 10' = 25.4 cm
$P2$ = 1 atmosphere = 1.01325 × 10$^6$ $u$ bars
$P1$ = 50 microns = 66.5 $u$ bars ≅ $o$ for this case
$NT$ = 21.7 × 10$^{-5}$ $u$ bar sec for Argon at 25°C $$Nm = \pi/16 N_T \cdot a^4/l \cdot (P_2^2 = P_1^2)/RoTm$$

$$= \pi/16(21.7) \cdot (1.25)^4/25.4 \cdot (1.013)^2/8.28\,(302) \times 10^5 \times 10^{-8} \times$$

$$10^{-7} \times 10^{12}$$

$= 3.75 \times 10^{-5}$ g moles/sec
$= 3.75 \times 22.4/28. \times 3600 = 0.106$ cu. ft./hour
with temperature changes (ignoring changes in tube length)

$$dNm/dT = -\pi/16 N_T^2 \cdot a^4/l\,(P_2^2/RoTm)\,dNT/dt$$

$$+ \pi/16 N_T \cdot 4a^3/l\,(P_2/RoTm)\,da/dT$$

$$- \pi/16 N_T \cdot a^4/l\,(P_2^2/RoTm^2)\,dTm/dT$$

If both sides are divided by $Nm$ where $$Nm = \pi/16 N_T \cdot a^4/l\,(P_2^2/RoTm)$$

$$1/Nm = +4/a\,(da/dT) - 1/N_T\,(dN_T/dT) - 1/Tm$$

since $da/dT$ 32 $ar$ and $r$ = coefficient of linear expansion and since $dN_T/dT = 0.766\,(.278 \times 10^{-6})\,T^{-0.234}$
then $$1/Nm \cdot dNm/dT \times 4\,(14 \times 10^{-6}) - 1/2.78 \times 10^{-6}\,T.766)$$

$$[0.766\,(2.78 \times 10^{-6})\,T^{-0.234}] - 1/Tm$$

$$300°K = 56 \times 10^{-6} - 0.766/300 - 1/300$$

$$\frac{dNm}{Nm} \Big/ °C. = \underset{\text{(capillary expansion)}}{56 \times 10^{-6}} \quad \underset{\text{(viscosity)}}{-.00232}$$

$$\underset{\text{(density)}}{-.0033} = 5.52 \times 10^{-3} = .0055$$

or the flow rate will change by about 0.5 percent for every ° C change in the tube (and hence the gas), temperature.

It is believed readily seen from the foregoing mathematical calculation that the major contributors to the change in flow rate are the decrease in density and the increase in viscosity.

Figure 2:
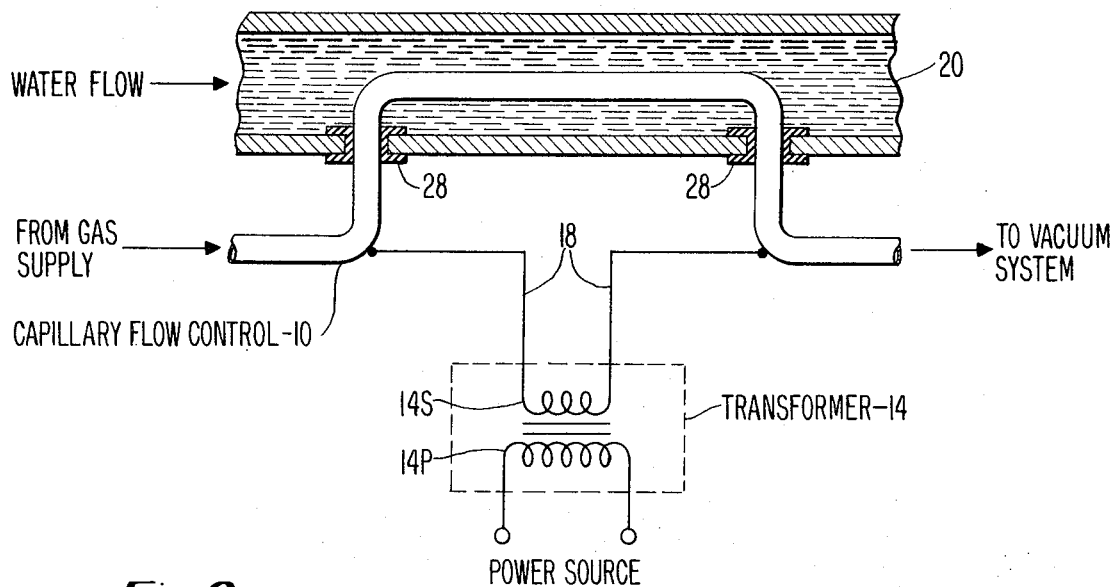
FIG. 2 illustrates the device utilizing a water jacket within the vacuum chamber.

FIG. 2 presents a slightly different configuration of the device utilizing a water jacket 20 surrounding the heated portion of the capillary tube 10. Thus the tube is cooled by having a water flow past the heated section of the tube.

Figure 3:
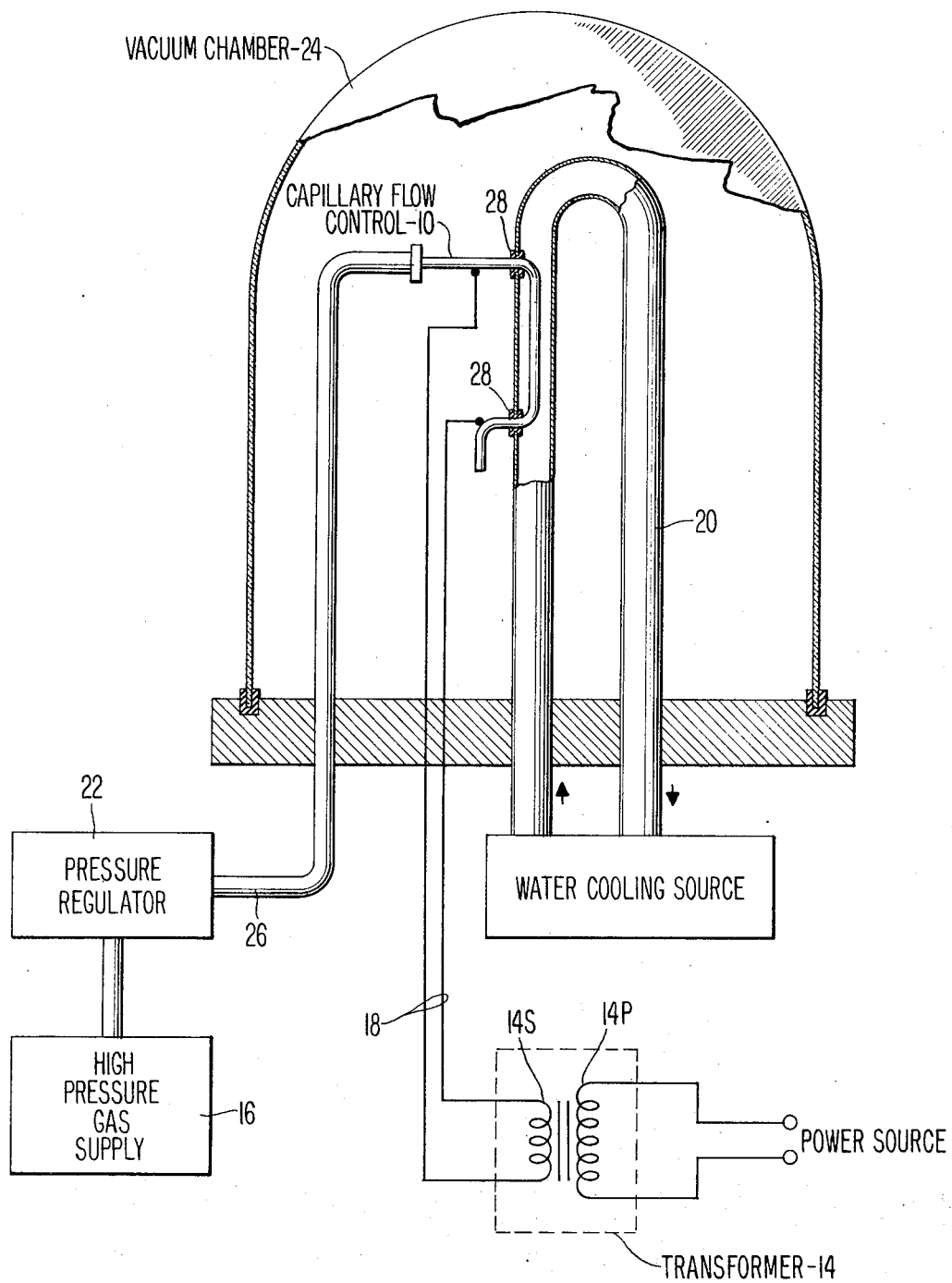
FIG. 3 illustrates the device of FIG. 2 housed within the vacuum chamber.

FIG. 3 illustrates the use of the flow control device within the vacuum chamber 24 itself to provide a system having extremely fast response. By inserting the conductor 18 up through the base of the chamber, the capillary flow control portion of the capillary tube is heated within the vacuum chamber. Similarly, the tube 10 is cooled by the passage of cooling water. The pressure regulator 22 provides the properly regulated gas pressure to the capillary tube 10 via the gas line 26.

The transformer 14, of course, supplies the necessary electrical current via its secondary 14S to the capillary tube for heating purposes.

It should be apparent to one skilled in the art that there are other sources of power for heating and cooling of the capillary tube.

What has been described is considered only illustrative of the principles of this invention. Accordingly, numerous variations therein may be devised by one skilled in the art without departing from the spirit and scope of this invention.

What is claimed is:

1. Apparatus for varying the flow rate of gas into a vacuum system comprising:
    means for introducing said gas under Poiseville flow conditions into said vacuum system,
    means associated with said gas introducing means for heating said gas in said gas introducing means for reducing the flow rate of such gas into said vacuum system, and means associated with said heating means and said introducing means for cooling said gas in said introducing means for increasing the flow rate of said gas into said vacuum system.

2. The apparatus of claim 1 wherein said introducing means includes a length of capillary tubing.

3. The apparatus of claim 2 wherein said capillary tubing is electrically conductive.

4. The apparatus of claim 3 wherein said heating means includes means for introducing a heat producing electrical current in a section of said conductive typing; and wherein said cooling means includes means for cooling a section of said conductive tubing.

5. The apparatus of claim 4 wherein said heat producing electrical current means includes:
    an electrical transformer; and
    a pair of conductors connected between the secondary winding of said transformer and the heat producing section of said conductive tubing.

6. The apparatus of claim 5 wherein said cooling means includes a forced air producing source directed at a section of said conductive tubing.

7. The apparatus of claim 5 wherein said cooling means includes a water jacket encasing a section of said conductive tubing.

8. An apparatus for varying the flow rate of gas through a capillary tube comprising:
- means for heating said gas in a section of said tube for reducing the flow rate of said gas through said tube; and
- means associated with said heating means for cooling said gas in the section of said tube for increasing the flow rate of said gas through said tube.

9. An apparatus for varying the flow rate of gas through a capillary tube into a vacuum system comprising:
- means for heating said gas in a section of said tube for reducing the flow rate of said gas into said vacuum system; and
- means associated with said heating means for cooling said gas in the section of said tube for increasing the flow rate of said gas into said vacuum system.

* * * * *